United States Patent
Subbarao et al.

(10) Patent No.: US 12,100,000 B2
(45) Date of Patent: *Sep. 24, 2024

(54) BIFURCATED DIGITAL WALLET SYSTEMS AND METHODS FOR PROCESSING TRANSACTIONS USING INFORMATION EXTRACTED FROM MULTIPLE SOURCES

(71) Applicant: Paymentus Corporation, Charlotte, NC (US)

(72) Inventors: Murali B. Subbarao, Saratoga, CA (US); Srinivas S. Sunkara, Sunnyvale, CA (US); Suzzanne D. Usiskin, Palo Alto (NC)

(73) Assignee: PAYMENTUS CORPORATION, Charlotte, NC (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/684,401

(22) Filed: Mar. 1, 2022

(65) Prior Publication Data

US 2022/0300963 A1  Sep. 22, 2022

Related U.S. Application Data

(63) Continuation of application No. 14/663,840, filed on Mar. 20, 2015, now Pat. No. 11,295,304.

(Continued)

(51) Int. Cl.
*G06Q 20/40* (2012.01)
*G06Q 20/12* (2012.01)
(Continued)

(52) U.S. Cl.
CPC ............ *G06Q 20/40* (2013.01); *G06Q 20/12* (2013.01); *G06Q 20/36* (2013.01); *G06Q 20/363* (2013.01);

(Continued)

(58) Field of Classification Search
CPC ........ G06Q 20/40; G06Q 20/12; G06Q 20/36; G06Q 20/363; G06Q 20/382; G06Q 20/3821; G06Q 20/4014

(Continued)

(56) References Cited

U.S. PATENT DOCUMENTS 6,873,974 B1  3/2005  Schutzer
2002/0091646 A1  7/2002  Lake
(Continued)

OTHER PUBLICATIONS

"A multi-Stage Fingerprint Recognition Method for Payment Verification System", Woong-Sik Kim, Department of Medical IT Engineering, Biomedical Engineering Konyang University, 2013 (Year: 2013).*

(Continued)

*Primary Examiner* — Hai Tran
(74) *Attorney, Agent, or Firm* — ALSTON & BIRD LLP

(57) ABSTRACT

A system and method for creating and accessing a bifurcated digital wallet is described. The method comprises of processor implemented steps of authenticating by an authentication server one or more authentication information sent by a user terminal to the authentication server; extracting a first set of information by the authentication server based on the authentication of the authentication information; extracting a second set of information by one or more second servers based on the authentication of the authentication information; collating the first set of information and second set of information and displaying the collated information at the user terminal for processing a transaction.

19 Claims, 7 Drawing Sheets

Related U.S. Application Data

(60) Provisional application No. 61/968,038, filed on Mar. 20, 2014.

(51) Int. Cl.
  *G06Q 20/36* (2012.01)
  *G06Q 20/38* (2012.01)

(52) U.S. Cl.
  CPC ....... *G06Q 20/382* (2013.01); *G06Q 20/3821* (2013.01); *G06Q 20/4014* (2013.01)

(58) Field of Classification Search
  USPC .......................................................... 705/44
  See application file for complete search history.

(56) References Cited

U.S. PATENT DOCUMENTS

| | | |
|---|---|---|
| 2002/0128977 A1 | 9/2002 | Nambiar |
| 2003/0096596 A1 | 5/2003 | Sini |
| 2006/0229985 A1 | 10/2006 | Lalwani |
| 2009/0104888 A1 | 4/2009 | Cox |
| 2009/0132392 A1 | 5/2009 | Davis |
| 2013/0254115 A1 | 9/2013 | Pasa |
| 2013/0297390 A1* | 11/2013 | Jaquez ................. G06Q 20/36 705/41 |
| 2013/0346302 A1 | 12/2013 | Purves |
| 2015/0170141 A1 | 6/2015 | Klingen |

OTHER PUBLICATIONS

U.S. Appl. No. 14/663,840, filed Mar. 20, 2015, U.S. Pat. No. 11,295,304, Issued.

* cited by examiner

BIFURCATED DIGITAL WALLET SYSTEMS AND METHODS FOR PROCESSING TRANSACTIONS USING INFORMATION EXTRACTED FROM MULTIPLE SOURCES

CROSS-REFERENCE TO RELATED APPLICATIONS

The present application is a continuation of U.S. Non-Provisional patent application Ser. No. 14/663,840, filed Mar. 20, 2015 and entitled "Bifurcated Digital Wallet Systems and Methods for Processing Transactions using Information Extracted from Multiple Sources," which claims priority to, and the benefit of, U.S. Provisional Application Ser. No. 61/968,038, filed Mar. 20, 2014 and entitled "Systems and Methods for Creating and Accessing Electronic Wallet, the entire disclosures of each of which are hereby incorporated herein by reference in their entireties for all purposes.

FIELD OF THE INVENTION

The present disclosure relates generally to digital shopping, and more particularly to creating and access a bifurcated digital wallet by sourcing information from a plurality of sources, such as servers.

BACKGROUND

Digital shopping is a form of remote commerce, which allows customers to purchase available products without having to go to a brick and mortar store to buy products of their choice. Digital shopping at a marketplace or any other site enables customers to view products and services provided by various retailers. Digital shopping also enables geographically distributed retailers that may or may not be physically located near their potential customers to be connected with them. At present, a large number of websites and applications are available that present a global platform for digital shopping. These websites and applications allow customers to view entire lists of products that the customers wish to buy, providing them with a wide variety of options to choose from. The purchase transactions on such websites and applications are made through secure encrypted communication pipes, thus, making the transaction secure and comfortable for the customers.

The customers are required to remember and fill details such as payment credentials, billing addresses, shipping addresses and the like at merchant websites and applications in order to initiate purchase transactions. An alternative method well known in the art is that the customers can store information required for transaction such as their payment credential information, billing address information, shipping address information and the like in a digital wallet stored in a database maintained at a server that can be accessed over a network. The customers can utilize the digital wall et for initiating the purchase transactions at merchant websites.

However, the existing methods either require remembering and individually providing the personal details for transaction or the present methods rely on a single server storing all the personal details in a secure digital wallet. However, a single server may not have all the personal details or the server may not be set up to accept additional details the user may want to store or the user may be reluctant to store some personal details at a single server. Moreover, depending on the security mechanism provided by a single server storing all the confidential user information may ease breaking into the server that may compromise the user information. Hence, there exists a need for creating and accessing a secure digital wallet such that the personal details and transaction details can be maintained at a plurality of different secure servers and later combined for presenting to the customers during a transaction.

SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a system for creating and accessing a bifurcated digital wallet is described. The system comprises of a user terminal used by a user and configured for entering one or more authorization information; an authentication server for authenticating the one or more authorization information, wherein the authentication server automatically extracts a first set of information upon successfully authenticating the one or more authorization information; and one or more second servers for automatically extracting a second set of information based on the authentication by the authentication server, wherein the first set of information and the second set of information is displayed at the user terminal for processing a transaction.

In another embodiment, a method for creating and accessing a bifurcated digital wallet is described. The method comprises of processor implemented steps of authenticating by an authentication server one or more authentication information sent by a user terminal to the authentication server; extracting a first set of information by the authentication server based on the authentication of the authentication information; extracting a second set of information by one or more second servers based on the authentication of the authentication information; collating the first set of information and second set of information and displaying the collated information at the user terminal for processing a transaction.

It is an object of the present invention to provide a system and a method for digital authentication for enabling digital transaction that is not limited by the capabilities of an authentication provider.

It is another object of the present invention to provide a method for digital authentication for facilitating digital transaction that is familiar to the end users and does not require a new mechanism to be created or remembered by the user.

It is another object of the present invention to expand the digital wallet information of a user and be not limited by the capabilities of the authentication provider. For example, enable an authentication provider who may not set up to capture or store multiple shipping addresses to expand their digital wallet without altering their systems.

It is another object of the present invention to create the bifurcated digital wallet such that a plurality of different data stores authentication server can be seamlessly combined to create a better customer experience.

Other systems, methods, features and advantages will be, or will become, apparent to one with skills in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
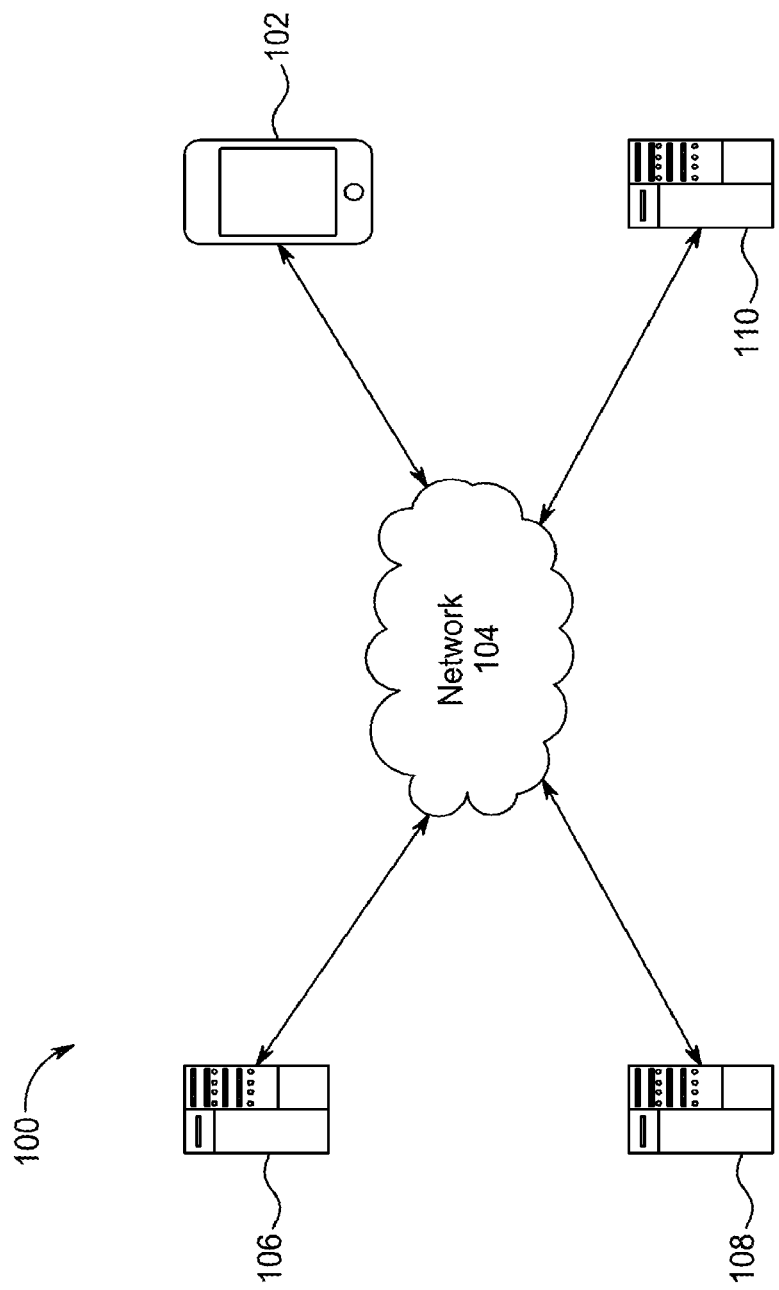
FIG. 1 is a block diagram illustrating a web transaction system environment for creating and accessing a bifurcated digital wallet in accordance with various embodiments.

FIG. 1 is a block diagram illustrating a web transaction system environment 100 for creating and accessing a bifurcated digital wallet in accordance with various embodiments. A digital wallet generally includes transaction information and personal information of a user. The transaction information and personal information of a user may comprise a billing address, a shipping address, bank account details, credit card details, debit card details, gift card details, coupon codes, gift vouchers, loyalty points information, and/or the like. The word bifurcated herein means that the information related to a user may be stored and sourced from a plurality of sources and servers and not necessarily only two sources or servers. The novel aspects of the invention may be implemented in a plurality of ways, the following description describes the invention according to possible example embodiments.

According to the first example embodiment, the system environment 100 includes a user terminal 102, a network 104, an authentication server 106, and one or more second servers 108 and a merchant server 110. Though FIG. 1 depicts only one second server 108, it is to be understood that a plurality of second servers can be connected to the network that can be accessed according to the various aspects of the present disclosure. The user terminal 102, the authentication server 106, the second server 108, and the merchant server 110 are communicatively coupled with each other by means of the network 104 such as internet.

The user terminal 102 enables a user to interact with the merchant server 110 relating to a marketplace, service provider, an e-commerce website for browsing through various products or services provided by the server. The merchant server 110 may in turn be connected to one or more databases (not depicted in the figure) for storing information related to various products or services that are made available to the user for purchase. Moreover, the one or more databases connected to the merchant server 110 may store information related to the user such as a user profile.

The user terminal 102 enables the user to select a product or service required by the user for purchasing. The user terminal 102 also includes at least one input means and an output means for providing user input and to display one or more information to the user. The user terminal 102 may include input means such as keyboard, mouse, touch pad, digital pen, voice input device, touch input device, and the like. The user terminal 102 may include output means such as a display, speakers, printer, and the like. The user terminal 102 may include one or more storage means such as a hard disk, main memory, flash memory, cloud based storage, and the like, that may be coupled with a processor. The user terminal 102 is configured to run an operating system, a software program and one or more software applications by means of the processor. In another embodiment, the user terminal 102 may include a software component that can be included as part of the operating system or can be included later as a software download. It will be apparent to a person having ordinary skills in the art that the disclosed embodiments can be implemented for a variety of user terminals including, but not limited to, a desktop computer, a laptop, a personal digital assistant (PDA), a tablet computer, a mobile phone, a smartphone, and the like. In an aspect, the method described in the present disclosure may be embedded in one or more applications such as a web browser or any other applications by means of a software development kit. The user terminal 102 at the time of checkout i.e. while paying for the selected product or service or bill is required to input transaction information for executing the payment. Such input of transaction information according to an embodiment may be divided into two main steps namely authentication/authorization and data extraction. The method for authentication and the step of data extraction may be processed by a plurality of servers communicatively coupled with the server executing the payment and therefore requiring the transaction information. In an aspect, where the method described by the present disclosure is stored as a plug-in to the web browser of the user terminal, the plug-in may prompt the user to perform the payment transaction through the same. In such a case, the user terminal by means of such a plug-in or any other program code may perform the transaction by exchanging information between the authentication server 106, one or more second servers 108, and the merchant server 110.

The authentication server 106 relates to an account of the user. In an aspect, the authentication server 106 may relate to a social media account of the user, an email account of the user, a mobile phone account of the user and the like. The authentication server 106 authenticates that the user conducting the transaction is the user to which the account present on the authentication server 106. The authentication server 106 for authentication may require the user to enter a user id and password related to the account of the user. In an example aspect, the authentication server 106 may generate a one-time password that may be sent to the user's mobile phone number or to the user's email that is registered with the user account present in the authentication server 106. In yet another aspect, the authentication server 106 may require the user to enter certain personal information such as the zip code of the user, mobile phone number, or any other information by which the user may be authenticated. Upon authorization, the authentication server 106 may or may not provide personal information and transaction information of the user based on certain regulatory rules or certain security rules. In an aspect, the authentication server 106 may provide a first set of information which may be certain personal information, transactional information, and the like. In another aspect, the first set of information provided by the authentication server may be a unique token for ascertaining that the user has been authenticated and the first information might not comprise any user information.

The authentication server 106 may store one or more personal information regarding the user including user name, user's shipping address, user's billing address, email address, phone number(s), credit card information, bank account information and the like that may be provided to the merchant server 110 for executing the transaction. In an ideal case, the authentication server 106 provides all the information required for completing the transaction. However, the authentication server 106 may not have all the information required for processing a transaction. For example, an authentication server related to a mobile phone account of the user may store or automatically procure billing address information of the user but may not store the shipping address of the user. In another example, an authentication server related to a social media account may store the contact details of the user and may not store the billing information of the user. Even after authorization the user information may not be automatically sent to the server executing the payment which is different from the authentication server 106 due to issues such as PCI compliance issues, regulatory issues, security concerns, and the like. Hence, the missing details required for a transaction are either required to be filed by the user or the missing information may be procured from secondary servers such the one or more second server 108. In another embodiment, the missing details required for a transaction are either required to be filed by the user or the missing information may be procured from secondary servers such as the one or more second servers 108. In an aspect, the authentication server 106 may not provide any stored information regarding the user that may be used for a transaction in such a case all the information is either required to be entered by the user or the information is procured from the one or more second servers 108.

The one or more second servers 108 are also referred to as secondary servers in the present disclosure and may maintain certain personal and transactional information of the user. The one or more second servers 108 may be connected to one or more secure databases that store the personal and transactional information of the user. The transactional information may include but not be limited to user's name, user's address, email address, phone number(s), and the like. In an example, the secondary servers 108 may be related to one or more e-commerce websites or applications on which the user is registered. The secondary servers 108 may also relate to one or more utility service providers, government organizations, mobile phone service provider, and the like. In a specific scenario, a second server 108 related to an e-commerce website may be contacted upon authentication for providing missing details that are required for transaction. In an embodiment, the user may be required to authorize procuring information from one or more second servers 108. The user may authorize procuring information from his e-commerce related accounts, social media accounts, and the like and may not authorize procuring information directly from a bank account server. In another embodiment, one or more second servers 108 may act as a data aggregator that compiles user profiles with various attributes and personal information. Such information can be retrieved using one or more attributes as an index. For example, using the mobile phone number to pull the personal details of the user such as name, address, email, card information, and the like.

Once, the user authenticates and authorizes procuring information from the one or more second servers 108, information stored in such servers or one or more databases to which the servers are connected to may be procured. In an embodiment, the second server 108 may relate to one or more social media accounts. In another embodiment, the second server 108 may relate to one or more telecom carrier provider accounts. Upon, authorization the personal details such as user's name, user's mobile phone number and the transaction details such as billing address, shipping address, and information related to the credit card using which the user usually transacts may be procured from the one or more second servers 108. In an aspect, distinct second servers may be contacted for extracting different information. Once, the required information is procured, the user is presented the procured information at the user terminal 102 for verification. In an aspect, the user may edit the procured information as the procured information may not be the latest information of the user. In another aspect, the user may edit the procured information as the user may need to use a different payment method or a different account for payment. The information is present to the user in such a manner that the procuring of information seems to be seamless to the user and reduces the time taken for a transaction thereby increasing the efficiency of the server executing the payment process. Moreover, procuring user information from a plurality of sources provides data security as the information stored a single server is more vulnerable to various malicious attacks.

According to an embodiment, the user terminal 102 may comprise of a memory, a processor and a program code stored in the memory, wherein the processor is configured for executing the program code. The program code may comprise of an application such as a web application, web browser with a plug-in, and the like. Upon execution of the program code such as plug-in of a web browser, one or more authentication information may be required to be inputted by the user by means of an input device of the user terminal. The one or more authentication information may then be sent to the authentication server 106 for authentication. The authentication server 106 may be connected to one or more databases (not depicted in the figure) for ascertaining the authenticity of the provided authentication information. Upon successful authentication, a first set of information may be received from the authentication server. As described above, the first set of information may in certain cases be personal or transactional information or a merely a unique token. The one or more second servers 108 are then queried based on the first set of information for receiving a second set of information. As described above, such second set of information may be certain personal or transactional information. The first set of information (in case first set of information contains personal or transactional information) and second set information is then displayed at the user terminal 102. The user terminal 102 may then be enabled to perform operations such as edit, select, add, and the like to the displayed information. Once, the user is satisfied of the information to be used for transaction, then the edited or selected or newly added information is sent to the merchant server 110 for processing the transaction. In an aspect, the retrieved information from the authentication server and/or the one or more second servers may be stored in the user terminal 102 for future use. The system by enabling the user terminal 102 to store the retrieved information which includes a user's personal and transactional information ensures the security of the user information as the information is stored on the user's device for ready access. The program code stored in the memory of the user terminal 102 may include one or more modules such as an authentication module for directing the authentication server for authenticating the information received from the user, an authorization module for enabling the user to authorize one or more second servers to be queried, an information editor module for enabling the user to edit the information received from one or more servers, and a transaction module for sending information to the merchant server for processing the transaction.

In an alternate embodiment, the system 100 may enable the merchant server 110 for communicating with and directing the authentication server 106 to authenticate and the one or more second servers 108 to extract information. According to such an embodiment, the merchant server 110 enables one or more authentication information to be sent from the user terminal 102 to the authentication server 106. Upon successful authentication, the merchant server 110 receives the first set of information from the authentication server 106. The merchant server 110 may then query the one or more second servers 108 based on the first set of information for receiving the second set of information. The first set of information (in case first set of information contains personal or transactional information) and second set information is then displayed at the user terminal 102. The merchant server 110 may then enable the user by means of the user terminal 102 to perform operations such as edit, select, add, and the like to the displayed information. Once, the user is satisfied with the information to be used for transaction, the edited or selected or newly added information may be accepted by the merchant server 110 for processing the transaction. The merchant server 110 may be connected to one or more databases (not depicted in the figure) that may store such retrieved information for future use. In an aspect, the retrieved first set of information and the second set of information may be stored under a user profile of the user. The merchant server 110 may include a program code that may be executed by one or more processors of the merchant server 110. The program code may include one or more modules such as an authentication module for directing the authentication server for authenticating the information received from the user, an authorization module for enabling the user by means of the user terminal 102 to authorize one or more second servers to be queried, an information editor module for enabling the user by means of the user terminal 102 to edit the information received from one or more servers, and a transaction module for processing the transaction based on the information selected or added by the user.

In an alternate embodiment, the system 100 may also comprise of a transaction facilitating server (not depicted in the figure) that may be communicatively coupled with the user terminal 102, merchant server 110, the authentication server 106, and the one or more second servers 108. The transaction facilitating server may be configured for communicating with and directing the authentication server 106 to authenticate and the one or more second servers 108 to extract information. The transaction facilitating server may be configured to receive the one or more authentication information from the user terminal 102. The one or more authentication information received from the user terminal 102 can then be sent to the authentication server 106. In response, the first set of information can then be received from the authentication server 106 upon successful authentication. The transaction facilitating server may then query the one or more second servers 108 based on the first set of information for receiving the second set of information. The first set of information (in case first set of information contains personal or transactional information) and second set information is then displayed at the user terminal 102. The transaction facilitating server may then enable the user by means of the user terminal 102 to perform operations such as edit, select, add, and the like to the displayed information. Once, the user is satisfied with the information to be used for transaction, the edited or selected or newly added information may be sent to the merchant server 110 by the transaction facilitating server for processing the transaction.

The transaction facilitating server may be connected to one or more databases that may store such retrieved information for future use. The transaction facilitating server may include a program code that may be executed by one or more processors of the transaction facilitating server. The program code may include one or more modules such as an authentication module for directing the authentication server for authenticating the information received from the user, an authorization module for enabling the user by means of the user terminal 102 to authorize one or more second servers to be queried, an information editor module for enabling the user by means of the user terminal 102 to edit the information received from one or more servers, and a transaction module for sending the edited, selected or added information for processing the transaction at the merchant server 110. In an embodiment of the present invention, the transaction facilitating server may not be allowed to store any information stored at the authentication server 106 or at the one or more second servers 108. For example, shipping address information maintained at the authentication server may not be allowed to be stored at the transaction facilitating server.

Figure 2:
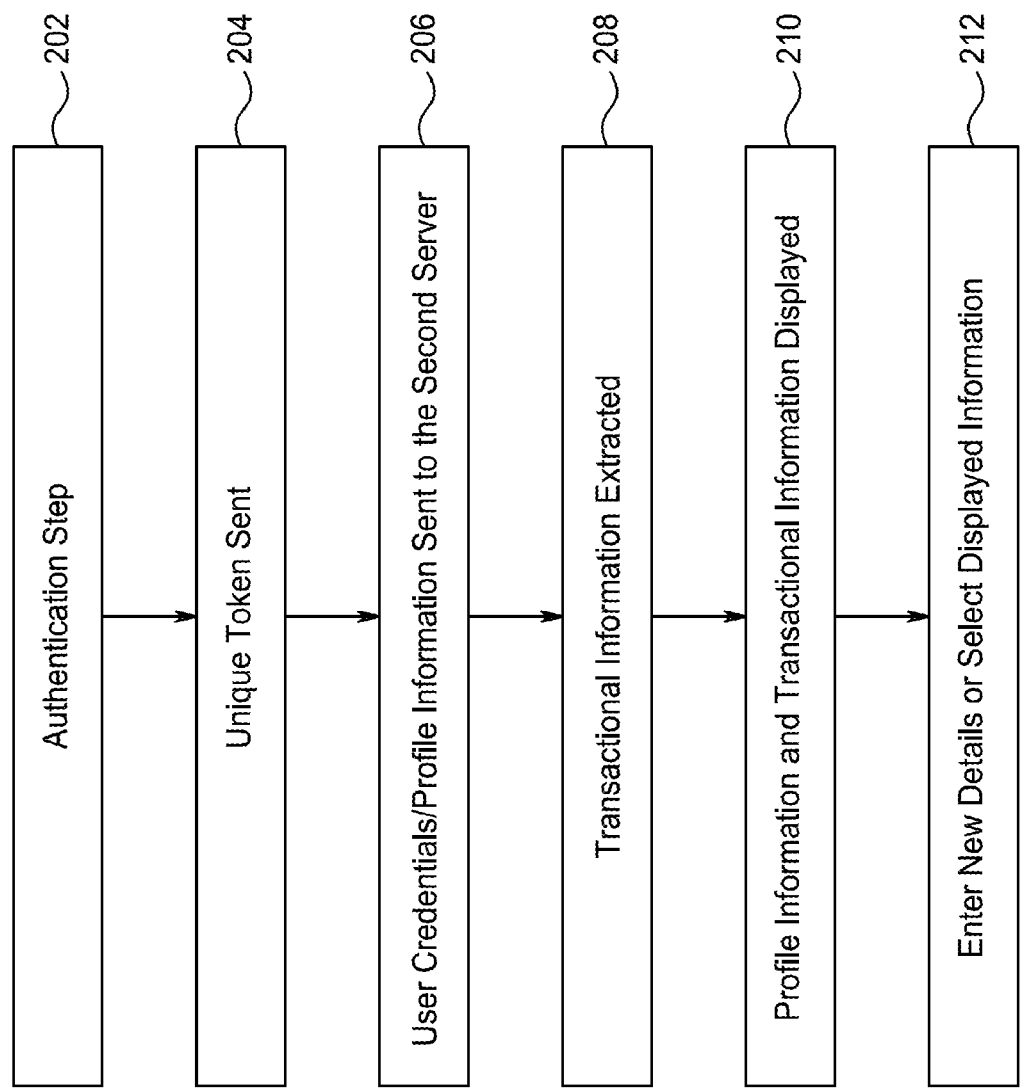
FIG. 2 depicts a flowchart illustrating a method for creating and accessing a bifurcated digital wallet in accordance with an embodiment.

FIG. 2 depicts a flowchart illustrating a method for accessing a bifurcated digital wallet in accordance with an embodiment. At step 202, the authentication is enabled by an authentication entity such as a phone connection provider or a social community, email service provider and the like. The user by means of a user terminal may select the means by which the user wants to authenticate. Upon such a selection of authentication, the server of the authenticating entity is contacted for initiating the authentication process. In this authentication step, the user is required to input either one or more user credentials, one time passwords, or combination of both. The user may also be provided a list of options for providing an authorization for procuring information. Alternatively, a list of sources from where information may be procured may be preselected. For example, a user may authorize procuring information from one or more utility service providers, a group or club, an e-commerce website, and the like. The authorization provided by the user may be stored for future utilization as well. In an example embodiment, upon authentication user may edit or add to the payment credentials, billing address, shipping address and the like that are provided to the second server.

Upon authentication with the authentication server, at step 204, one or more servers of the one or more sources that are authorized for procuring information are sent a unique token from the authentication server for confirming that the authentication credentials presented by the user to the authentication entity have been accepted. The receipt of the unique token informs the one or more sources that an authentic user requires procuring information stored in the servers. The unique token may be time stamped and various security measures may be taken such that no malicious use of information can take place.

At step 206, the one or more servers upon receiving the unique token may be provided with one or more user related credentials that are procured from the authentication server, such as user's name, payment credentials, billing address, shipping address, e-mail id, mobile phone number, and the like. In an embodiment, the information supplied from authentication server to the second server may not be maintained by the second server.

At step 208, upon authentication the transactional information related to the user stored in a secure database may be extracted by the one or more authorized servers. The transactional information may include but not limited to one or more credit card details, one or more debit card details, one or more net banking details, and the like. In an aspect, the user related credentials sent by the authentication server to the one or more servers may be used for extracting the transactional information stored in the second server.

At step 210, the user related credentials extracted by the authentication server and the transactional information extracted by the one or more secondary servers may be combined together and may be displayed to the user on the user terminal.

At step 212, the displayed information may either be selected by the user for a current transaction or the user may be facilitated with an option to enter additional details. For example, the user may be displayed the residential address of the user related to the authentication entity as the shipping address and a previously stored payment method as the payment method for the current transaction. In an embodiment of the present invention, the one or more authorized servers may store any new information entered by the user such as a new shipping address, a new payment credentials, a new billing address and the like. In another embodiment of the present invention, the user may also correct the user related credentials displayed and the same corrections may then be stored in the authentication server.

Figure 3:
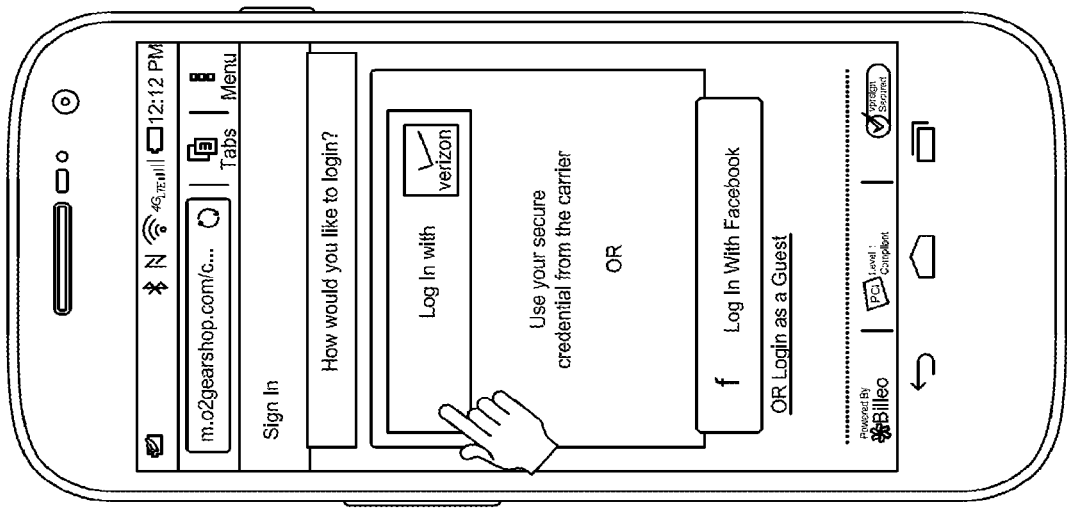
FIG. 3 illustrates a user terminal having a transaction application for transacting using the described method, according to an embodiment.

FIG. 3 illustrates a user terminal having a transaction application for transacting using the described method, according to an embodiment. The application may be a mobile application or a web browser. The authentication step may be executed by means of the authentication server accessible over a network that is related to an authentication entity such as a phone connection company, for example Verizon®, or a digital community, for example Facebook®, or an entity to which the user may be a member. The user having an account with the authentication entity may be prompted to provide an authentication code such as a password or billing Zip Code or a biometric input such as fingerprint or eye scan on the device tied to the user's account. In another embodiment of the present disclosure, the authentication step may involve more than one authentication procedures for example, a security code may be sent by an authentication server to a phone number or e-mail id associated with the user's account that the user is required to enter for completing the authentication step.

Such authentication entity may have access to profile information regarding the user such as name, billing address, office address, home phone number, mobile phone number, email id, credit card details, bank account details and the like, that is stored at the authentication server. Upon authentication, one or more second servers is provided an authentication signal thereby enabling the second server to access transactional information stored at a secure database. In an embodiment of the present invention, the transactional information may comprise of credit card details, debit card details, net banking details, and the like. The second server then extracts the profile information from the authentication server and the transactional information from the secure database maintained at the second server and presents the same at the user terminal 102 utilizing the application installed at the user terminal.

Figure 4:
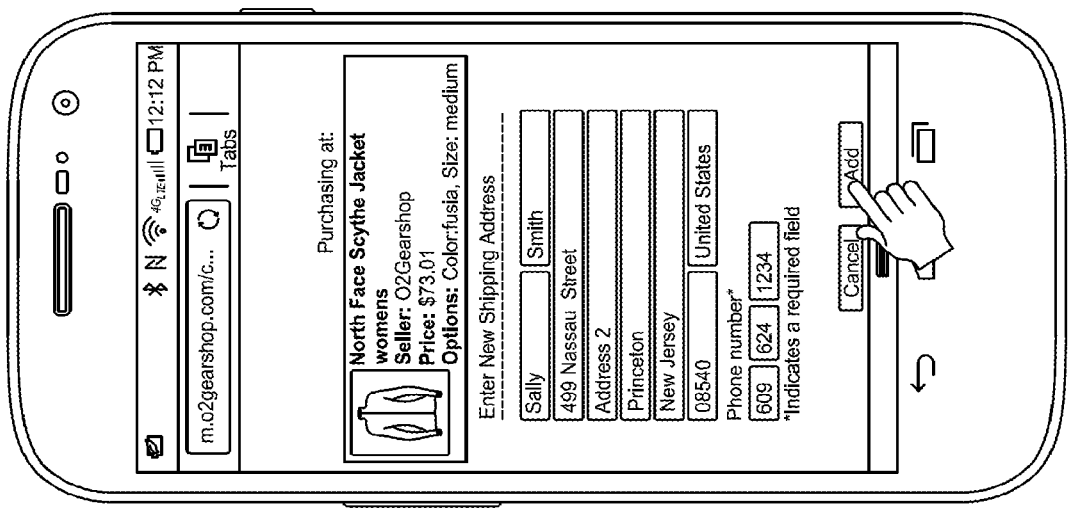
FIG. 4 illustrates the installed application prompting the user to either select a pre stored shipping address or enter a new shipping address.
Figure 4:
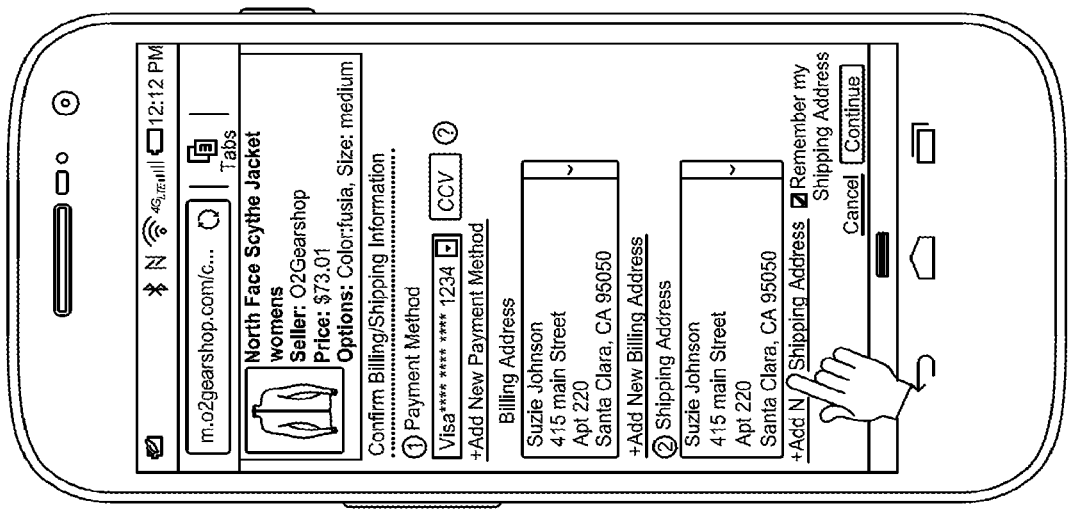
Figure 5:
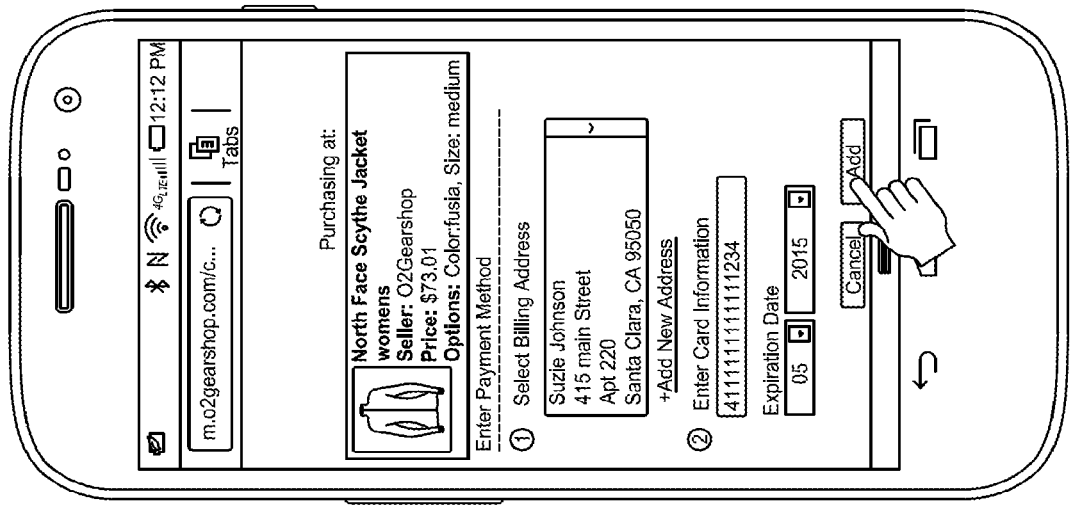
FIG. 5 illustrates the installed application prompting the user to either select a pre stored payment method and billing address or enter a new payment method and/or billing address.
Figure 5:
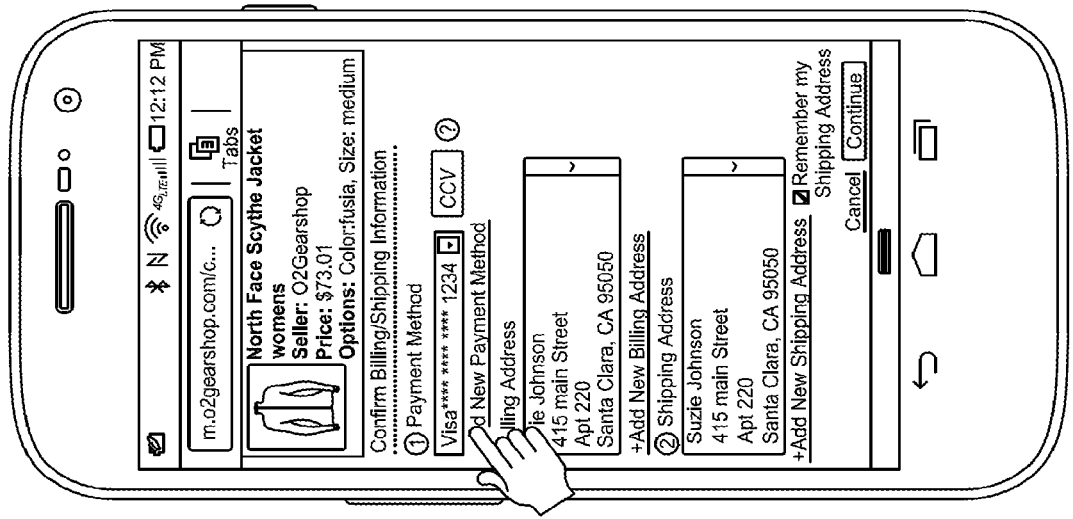

FIG. 4 illustrates the installed application prompting the user to either select a pre stored shipping address or enter a new shipping address. FIG. 5 illustrates the installed application prompting the user to either select a pre stored payment method or enter a new payment method. The application is installed in a user terminal such as a mobile phone, laptop, personal computer, personal digital assistant, and the like. The user by means of the user terminal may either select the information extracted from the authentication server and the second server or the user may add new information. In an aspect, any information selected by the user may be stored as the preferred information for future transactions. In another aspect, any new information inputted by the user may be stored as an alternate transaction or personal information.

Figure 6A:
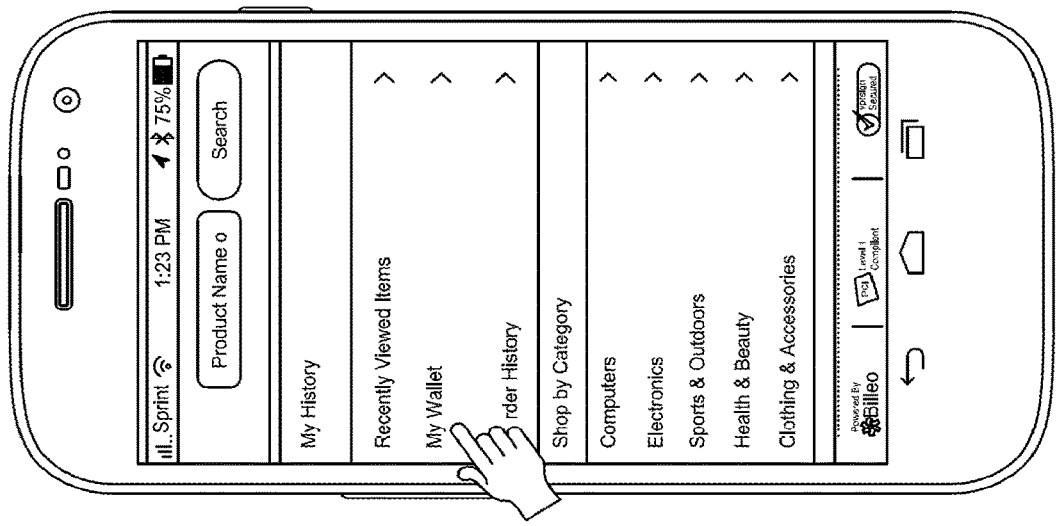
FIG. 6A and FIG. 6B illustrate the installed application facilitating the user to select a payment method and a shipping address from a bifurcated digital wallet.
Figure 6B:
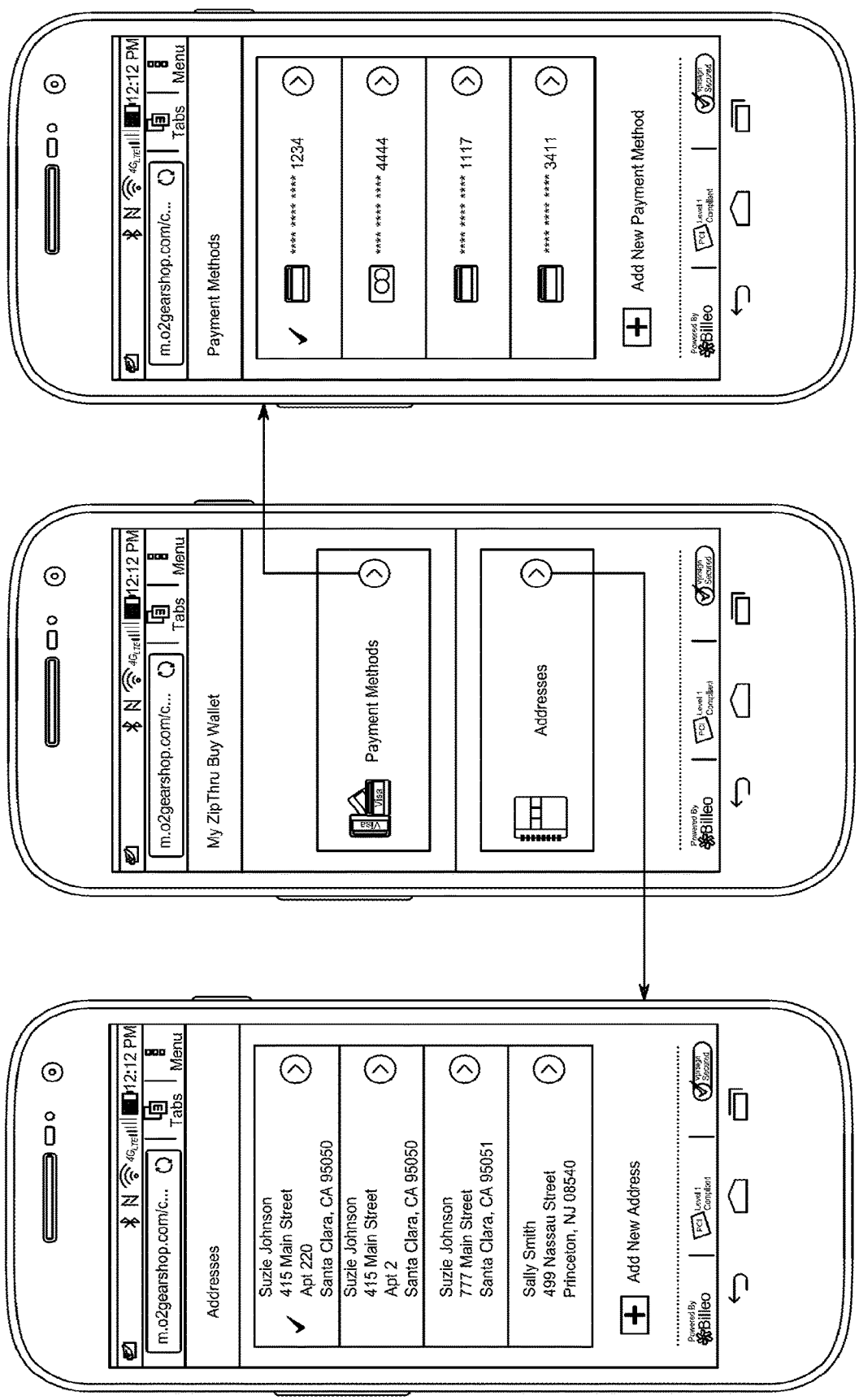

FIG. 6A and FIG. 6B illustrate the installed application facilitating the user to select a payment method and a shipping address from a bifurcated digital wallet. The bifurcated digital wallet provides a user with at least an option of selecting a payment method and an option of selecting an address. The payment method may allow the user to select stored one or more credit card information, one or more debit card information, one or more bank account information, one or more cash on delivery options, and the like. The address may further include selecting the billing address and the shipping address of the user. The address may be previously stored. The user may also be enabled for adding new addresses. In an example embodiment, the bifurcated digital wallet may either be provided as an in-built option in a vendor's application/website or may be installed in the user terminal as a plug-in to the web browser of the user.

The systems and methods disclosed herein present invention provide a consolidated view of the bifurcated digital wallet, whereby the user gets no visibility to the underlying bifurcation of storing the data in a plurality of different data stores. Though the present disclosure describes the method and system for executing a transaction, however, the method and system may be used in other situations as well where there is a need for securely procuring data from a plurality of sources as a single source does not store all the required information.

For example, described herein are a bifurcated digital wallet system and methods for processing transactions using information extracted from, or provided by, multiple sources. Such distribution of authentication information or the like can lead to improved security and privacy for the user, the transaction facilitator, the merchant, and the one or more sources, e.g., servers, storing or retrieving the authentication information on behalf of the user in order to authenticate the user and/or the digital wallet for use in processing a transaction with a merchant, for example.

According to an embodiment, an apparatus can be provided that comprises a processor and a memory storing program code, wherein the memory and the program code, when executed by the processor, causes the apparatus to: receive user unverified authentication information regarding a first account associated with a user and transaction information regarding the transaction between a user and a merchant, wherein the first account is managed by a first entity comprising one of the merchant, a payment processing entity, or a bank at which the user has an account. The memory and the program code, when executed by the processor, can further cause the apparatus to: instruct a user device to display the user unverified authentication information to the user and allow the user to modify or verify the user unverified authentication information. The memory and the program code, when executed by the processor, can further cause the apparatus to: receive, from the user device, user verified authentication information. The memory and the program code, when executed by the processor, can further cause the apparatus to: transmit, to an authentication server, with the user verified authentication information, a request for the authentication server to authenticate at least a portion of the user verified authentication information based upon independent information stored at the authentication server regarding the first account associated with the user. The memory and the program code, when executed by the processor, can further cause the apparatus to: in an instance in which the user verified authentication information is authenticated based upon the independent information stored at the authentication server, receive, from the authentication server, a first set of information. The memory and the program code, when executed by the processor, can further cause the apparatus to: automatically query, from one or more second servers, based at least upon the first set of information, a second set of information regarding a second account associated with the user, wherein the second account is managed by a second entity different from the first entity. The memory and the program code, when executed by the processor, can further cause the apparatus to: combine the first set of information and the second set of information to form a combined set of information. The memory and the program code, when executed by the processor, can further cause the apparatus to: instruct the user device to present the combined set of information to the user and allow the user to modify or verify the combined set of information. The memory and the program code, when executed by the processor, can further cause the apparatus to: receive, from the user device, a user-edited set of information or a user-approved set of information. The memory and the program code, when executed by the processor, can further cause the apparatus to: transmit, to the merchant server, the transaction information and one of the user-edited set of information or the user-approved set of information.

In some embodiments, the second account associated with the user is selected from a group consisting of: a social media account, an email account, and a phone service account. In some embodiments, the second set of information comprises information selected from the group consisting of: a user name, a user email address, a user phone number, a shipping address, a billing address, credit card information, debit card information, bank account information, vouchers, and loyalty credit points. In some embodiments, the input from the user to the user device indicative of a command to modify at least a portion of the user unverified information comprises providing a username, password, and biometric input. In some embodiments, the memory and the program code, when executed by the processor, can further cause the apparatus to: cause the authentication server to, generate a one-time password to send to at least another user device or an email account that is associated with the user; and cause the authentication server to, in an instance in which the user successfully inputs the one-time password, authenticate the user verified authentication information. In some embodiments, the apparatus comprises a transaction facilitating server.

According to another embodiment, a method can be carried out that comprises: receiving, at a transaction facilitating server, user unverified authentication information regarding a first account associated with a user and transaction information regarding the transaction between a user and a merchant, wherein the first account is managed by a first entity comprising one of the merchant, a payment processing entity, or a bank at which the user has an account. The method can further comprise: instructing a user device to display the user unverified authentication information to the user and allow the user to modify or verify the user unverified authentication information. The method can further comprise: receiving, at the transaction facilitating server, from the user device, user verified authentication information. The method can further comprise: transmitting, from the transaction facilitating server, to an authentication server, with the user verified authentication information, a request for the authentication server to authenticate at least a portion of the user verified authentication information based upon independent information stored at the authentication server regarding the first account associated with the user. The method can further comprise: in an instance in which the user verified authentication information is authenticated based upon the independent information stored at the authentication server, receiving, at the transaction facilitating server, from the authentication server, a first set of information. The method can further comprise: automatically querying, from one or more second servers, based at least upon the first set of information, a second set of information regarding a second account associated with the user, wherein the second account is managed by a second entity different from the first entity. The method can further comprise: combining the first set of information and the second set of information to form a combined set of information. The method can further comprise: instructing the user device to present the combined set of information to the user and allow the user to modify or verify the combined set of information. The method can further comprise: receiving, at the transaction facilitating server, from the user device, a user-edited set of information or a user-approved set of information. The method can further comprise: transmitting, from the transaction facilitating server, to the merchant server, the transaction information and one of the user-edited set of information or the user-approved set of information.

In some embodiments, the transaction facilitating server can comprise a memory, a processor and program code stored in the memory. In some embodiments, one or more of the first set of information and the combined set of information presented to the user are modified by the user in response to the user operably engaging the user device. In some embodiments, the second account associated with the user is selected from a group consisting of: a social media account, an email account, and a phone service account. In some embodiments, the second set of information comprises information selected from the group consisting of: a user name, a user email address, a user phone number, a shipping address, a billing address, credit card information, debit card information, bank account information, vouchers, and loyalty credit points. In some embodiments, the input from the user to the user device is indicative of a command to modify at least a portion of the user unverified information comprises providing a username, password, and biometric input.

In some embodiments, the method can further comprise: causing the authentication server to, upon receiving user verified information, transmit a one-time password to at least another user device or an email address associated with the user; and causing the authentication server to, in an instance in which the user successfully inputs the one-time password, authenticate the user modified unverified authentication information.

According to another embodiment, an alternative method can be carried out that comprises: receiving, at a transaction facilitating server, from a merchant server, a request for the transaction facilitating server to facilitate a transaction between a user and a merchant, the request comprising transaction information and user unverified authentication information related to a first account associated with the user and managed by a first entity, the first entity comprising one of: the merchant, a payment processing entity, or a bank at which the user holds a bank account. The method can further comprise: causing a user device associated with the user to display the user unverified authentication information to the user and allow the user to modify or verify the user unverified authentication information. The method can further comprise: receiving, from the user device, user verified authentication information. The method can further comprise: sending an authentication request to an authentication server, the authentication request comprising the user verified authentication information. The method can further comprise: receiving, from the authentication server, upon successful authentication of the user verified authentication information by the authentication server, an authentication confirmation comprising a first set of information. The method can further comprise: querying, using the transaction facilitating server, one or more second servers, based on the first set of information received from the authentication server, for a second set of information related to a second account associated with the user. The method can further comprise: receiving, from the one or more second servers, the second set of information related to the second account associated with the user. The method can further comprise: generating a combined set of information comprising the first set of information and the second set of information. The method can further comprise: causing the user device to present the first set of information and the second set of information to the user and allow the user to review and verify the first set of information and the second set of information. The method can further comprise: in an instance in which the user verifies the first and second sets of information, providing the first and second sets of information to the merchant server to facilitate processing of the transaction between the user and the merchant.

In some embodiments, the transaction facilitating server can comprise a memory, a processor and program code stored in the memory. In some embodiments, the second set of information comprises information selected from the group consisting of: a user name, a user email address, a user phone number, a shipping address, a billing address, credit card information, debit card information, bank account information, vouchers, and loyalty credit points. In some embodiments, one or more of the first set of information and the combined set of information presented to the user are modified by the user in response to the user operably engaging the user device. In some embodiments, the input from the user to the user device indicative of a command to modify at least a portion of the user unverified information comprises providing a username, password, and biometric input. In some embodiments, the second account associated with the user is selected from a group consisting of: a social media account, an email account, and a phone service account.

In some embodiments, the method can further comprise: causing the authentication server to generate a one-time password to send to at least another user device or an email address associated with the user; and causing the authentication server to, in an instance in which the user successfully inputs the one-time password, authenticate the user modified unverified authentication information.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps. The preceding description has been presented with reference to various embodiments. Persons skilled in the art and technology to which this application pertains will appreciate that alterations and changes in the described structures and methods of operation can be practiced without meaningfully departing from the principle, spirit and scope.

The invention claimed is:

1. An apparatus comprising:
   at least one processor; and
   at least one memory storing instructions thereon, wherein the instructions, when executed by the at least one processor, cause the apparatus to perform at least:
     receiving authentication information regarding a first account associated with a user and transaction information regarding a pending transaction between the user and a merchant server, wherein the first account is managed by a first entity comprising one of the merchant server, a payment processing entity, or a bank at which the user has an account;
     instructing a user device to display the authentication information for user review;
     in an instance in which one or more user inputs were provided by the user to the user device in response to the user review of the authentication information and the one or more user inputs indicate at least that no changes are required, receiving, from the user device, user reviewed authentication information;
     in an instance in which one or more other user inputs were provided by the user to the user device in response to the user review of the authentication information and the one or more other user inputs indicate at least one change to the authentication information, receiving, from the user device, user updated authentication information, the user updated authentication information reflecting the at least one change to the authentication information made by the user using the user device;
     transmitting, to an authentication server, an authentication request, the authentication request comprising one of the user reviewed authentication information or the user updated authentication information, the authentication request further comprising a request for the authentication server to authenticate at least a portion of the user reviewed authentication information or the user updated authentication information based upon independent information stored at the authentication server regarding the first account associated with the user;
     in an instance in which at least the portion of the user reviewed authentication information or the user updated authentication information is authenticated by the authentication server based upon the independent information stored at the authentication server, receiving, from the authentication server, a first set of information;
     automatically querying, from one or more second servers, based at least upon the first set of information, a second set of information regarding a second account associated with the user, wherein the second account is managed by a second entity different from the first entity; and
     transmitting, to the merchant server, the transaction information, the first set of information, and the second set of information to facilitate initiation of the transaction between the user and the merchant server.

2. The apparatus of claim 1, wherein the user review of the authentication information comprises the user modifying the authentication information to generate the user updated authentication information and then verifying that the user-reviewed updated authentication information is accurate and complete.

3. The apparatus of claim 1, wherein the user review of the authentication information comprises the user verifying that the authentication information is accurate and complete.

4. The apparatus of claim 1, wherein the second account associated with the user is a social media account.

5. The apparatus of claim 1, wherein the second set of information comprises user contact information.

6. The apparatus of claim 1, wherein the second set of information comprises user payment option information.

7. The apparatus of claim 1, wherein the user review of the authentication information comprises an input by the user, at the user device, of user biometric information.

8. The apparatus of claim 1, wherein the instructions stored on the at least one memory, when executed by the at least one processor, further cause the apparatus to perform:
   causing the authentication server to generate a one-time password to send to at least one of: the user device, another user device, or an email account that is associated with the user; and
   cause the authentication server to, in an instance in which the user successfully inputs the one-time password, authenticate the authentication information.

9. The apparatus of claim 1, wherein the apparatus comprises a transaction facilitating server.

10. A method comprising:
    receiving, at a transaction facilitating server, authentication information regarding a first account associated with a user and transaction information regarding a pending transaction between the user and a merchant server, wherein the first account is managed by a first entity comprising one of the merchant server, a payment processing entity, or a bank at which the user has an account;
    instructing a user device to display the authentication information for user review;

in an instance in which one or more user inputs were provided by the user to the user device in response to the user review of the authentication information and the one or more user inputs indicate at least that no changes are required, receiving, at the transaction facilitating server, from the user device, user reviewed authentication information;

in an instance in which one or more other user inputs were provided by the user to the user device in response to the user review of the authentication information and the one or more other user inputs indicate at least one change to the authentication information, receiving, at the transaction facilitating server, from the user device, user updated authentication information, the user updated authentication information reflecting the at least one change to the authentication information made by the user using the user device;

transmitting, from the transaction facilitating server, to an authentication server, an authentication request comprising the user reviewed authentication information or the user updated authentication information, the authentication request comprising a request for the authentication server to authenticate at least a portion of the user reviewed authentication information or the user updated authentication information based upon independent information stored at the authentication server regarding the first account associated with the user;

in an instance in which at least the portion of the user reviewed authentication information or the user updated authentication information is authenticated by the authentication server based upon the independent information stored at the authentication server, receiving, at the transaction facilitating server, from the authentication server, a first set of information;

automatically querying, from one or more second servers, based at least upon the first set of information, a second set of information regarding a second account associated with the user, wherein the second account is managed by a second entity different from the first entity; and transmitting, from the transaction facilitating server, to the merchant server, the transaction information, the first set of information, and the second set of information to facilitate initiation of the transaction between the user and the merchant server.

11. The method of claim 10, wherein the user review of the authentication information comprises the user modifying the authentication information to generate the user updated authentication information and then verifying that the user updated authentication information is accurate and complete.

12. The method of claim 10, wherein the user review of the authentication information comprises the user verifying that the authentication information is accurate and complete.

13. The method of claim 10, further comprising:
combining the first set of information and the second set of information to form a combined set of information;
instructing the user device to display the combined set of information for further user review;
receiving, at the transaction facilitating server, from the user device, a user-reviewed combined set of information; and
transmitting, with the transaction information, to the merchant server, the user-reviewed combined set of information.

14. The method of claim 10, wherein the second account associated with the user is a social media account.

15. The method of claim 10, wherein the second set of information comprises user contact information.

16. The method of claim 10, wherein the second set of information comprises user payment option information.

17. The method of claim 10, wherein the user review of the authentication information comprises an input by the user, at the user device, of user biometric information.

18. The method of claim 10, further comprising:
causing the authentication server to transmit a one-time password to at least one of: the user device, another user device, or an email address associated with the user; and
causing the authentication server to, in an instance in which the user successfully inputs the one-time password, authenticate the user reviewed authentication information or the user updated authentication information.

19. A transaction facilitation server comprising:
at least one processor; and
at least one memory storing instructions thereon that, when executed by the at least one processor, cause the transaction facilitation server to perform at least:
receiving first account information regarding a first account associated with a user and transaction information regarding a pending transaction between the user and a merchant, wherein the first account is managed by a first entity comprising one of the merchant, a payment processing entity, or a bank at which the user has an account;
transmitting, towards a user device, instructions to display for user review the first account information;
in an instance in which one or more user inputs provided by the user to the user device in response to the user review of the first account information indicate that no changes to the first account information are required, receiving, from the user device, user reviewed account information;
in an instance in which one or more other user inputs were provided by the user to the user device in response to the user review of the first account information and the one or more other user inputs indicate at least one change to the first account information, receiving, from the user device, user updated account information, the user updated account information reflecting the at least one change to the first account information made by the user using the user device;
transmitting, to an authentication server, an authentication request, the authentication request comprising one of the user reviewed account information or the user updated account information, the authentication request further comprising a request for the authentication server to authenticate at least a portion of the user reviewed account information or the user updated account information based upon independent information stored at the authentication server regarding the first account associated with the user;
in an instance in which at least the portion of the user reviewed account information or the user updated account information is authenticated by the authentication server, receiving, from the authentication server, first authentication information;
automatically querying, from one or more second servers, based at least upon the first authentication information, second authentication information regarding a second account associated with the user, wherein the second account is managed by a second entity different from the first entity; and transmitting, to a merchant device operated by the merchant, the transaction information, the first authentication information, and the second authentication information to facilitate initiation of the transaction between the user and the merchant.

* * * * *

UNITED STATES PATENT AND TRADEMARK OFFICE
CERTIFICATE OF CORRECTION

| | | |
|---|---|---|
| PATENT NO. | : 12,100,000 B2 | Page 1 of 1 |
| APPLICATION NO. | : 17/684401 | |
| DATED | : September 24, 2024 | |
| INVENTOR(S) | : Murali B. Subbarao et al. | |

It is certified that error appears in the above-identified patent and that said Letters Patent is hereby corrected as shown below:

On the Title Page

Item (72), Inventors, Line 3, delete "Suzzanne" and insert -- Suzanne --, therefor.

Item (72), Inventors, Line 4, delete "(NC)" and insert -- CA (US) --, therefor.

In the Claims

In Column 16, Lines 30-31, Claim 2, delete "user-reviewed updated" and insert -- user updated --, therefor.

Signed and Sealed this
Fourth Day of March, 2025

Coke Morgan Stewart
*Acting Director of the United States Patent and Trademark Office*